Sept. 7, 1926.

F. G. GISE 1,598,643

TIRE CHAIN CONNECTER

Filed Feb. 29, 1924

Inventor

Frank G. Gise

By Churl & Churl

His Attorneys

Patented Sept. 7, 1926.

1,598,643

UNITED STATES PATENT OFFICE.

FRANK G. GISE, OF YORK, PENNSYLVANIA, ASSIGNOR TO UNITED STATES CHAIN & FORGING COMPANY, OF PITTSBURGH, PENNSYLVANIA, A CORPORATION OF PENNSYLVANIA.

TIRE-CHAIN CONNECTER.

Application filed February 29, 1924. Serial No. 696,000.

This invention relates especially to the lever type of chain connecting devices or fasteners in which the lever pivoted on a connecter member is provided with a recess or slot to initially accommodate the link at the free end of the chain when the fastener is open and, as the lever is turned closed on its pivot, to direct said link into a link receiving slot in the connecter member, the connecter member being permanently attached to the opposite end of the chain. One illustration of this type of fastener is to be found in U. S. Patent No. 1, 397,056, granted November 15, 1921, to U. S. Chain & Forging Company, assignee of the present invention.

An object of the invention is to provide a fastener of the lever type with an arrangement of link receiving slots that will permit the free end of the chain to be easily placed in the lever recess and that will effect an increased tensioning of the chain around the tire as the latch lever is turned closed.

While this tensioning of the tire chain aids in preventing accidental opening of the fastener, the present invention also seeks to provide a fastener wherein the chain link cannot exert pressure against the walls of the latch lever slot to open the fastener.

Particular attention is called to the fact that in the present fastener the hook on the lever that initially receives the free end link of the chain and directs said link into its locked position in the connecter, is so formed as to be spaced, from the final position of the link, a considerable distance circumferentially of the tire when the fastener is open. This permits of the use of a comparatively shorter chain without detracting from the ease with which the free end link may be initially engaged with the hook and also insures tensioning of the chain when the fastener is closed.

In the accompanying drawings—

Figure 1:
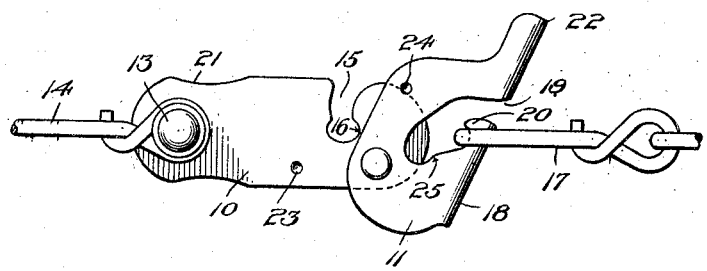
Figure 1 shows the end portions of a chain and a fastener constructed according to the present invention, the parts being shown as they appear when the free end link of the chain has been engaged in the hook recess of the latch lever.
Figure 2:
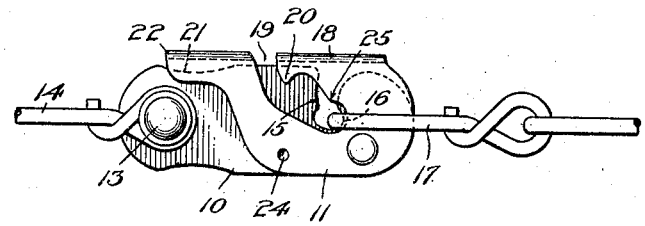
Fig. 2 is a similar view illustrating the same parts in their closed position.
Figure 3:
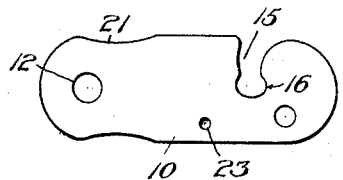
Fig. 3 is a side view of the connecter detached.
Figure 4:
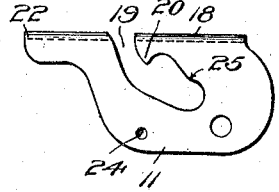
Figs. 4 and 5 are detail side and end views, respectively, of the latch lever detached.
Figure 5:
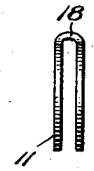

The fastener comprises a connecter 10 and a latch lever 11, and the connecter has an aperture 12 at one end in which there is secured a stud 13 for permanently securing the connecter to a link 14 at one end of the tire chain. Extending inwardly from one edge of the connecter there is a link receiving slot 15 whose inner end is somewhat enlarged to form a link receiving cove 16 where the free end link 17 of the chain is located when the ends of the chain are connected by the fastener.

To direct the free end link 17 into the slot and cove in the connecter, there is pivotally attached to the connecter the latch lever 11, the pivotal connection between these two parts being preferably located between the inner end of slot 15 and the other or opposite edge of the connecter. While the latch lever 11 may assume different shapes, it is illustrated in the present instance as being saddle or U-shaped, being formed of a stamping of sheet metal having two similar sides connected at one edge by a back 18.

The latch lever which, as usual, is adapted to turn on its pivot from open to closed position, is provided with a slot 19 that has one of its walls recessed to form a hook 20, the hook and slot being adapted to initially receive the free end link 17 when the fastener is open and direct said link into the connecter slot 15 when the lever is turned on its pivot to closed position. To secure an increased throw of the hook 20 about the pivot point of the latch lever, the slot 19 extends inwardly from the edge of lever remote from said pivotal connection between the lever and connecter,—that is, the edge of the lever formed by the lever back 18 or the edge that corresponds to the slotted edge of the connecter when the fastener is closed. In other words, viewing the fastener closed, the slots in the connecter and latch both extend inwardly from the same or adjacent edges of those elements. With this arrangement the slot 19 in the lever is spaced a considerable distance away from the link receiving cove 16 of the connecter when the parts are opened and will place the chain under sufficient tension when closed to retain the fastener closed. Furthermore, slot 19 being in the remote edge of the lever, instead of in the inner or near side of the lever with respect to the connecter, the free end link 17 does not have to be passed over the end of the lever to engage the hook 20. This permits the use of a chain a little shorter than can be used with other fasteners.

The inner end of the lever slot 19 registers with the cove 16 when the fastener is closed but the slots in the two members are formed therein at different angles with respect to the corresponding edges of said parts. In this way, when the lever is turned closed and the link 17 has been deposited in cove 16, the entrances of the two slots 15, 19 will be offset with respect to each other longitudinally of the fastener and the entrance to slot 15 closed by the lever, thus preventing escape of the link. This is true whether the lever be a plane sheet metal member or whether it be saddle-shaped, as illustrated, as the back 18 has nothing to do with the obstructing of the slot 15 but simply acts as a stop for limiting the closing movement of the lever 11.

The slotted edge of the connecter 10 is slightly dished out as at 21 to facilitate opening the fastener by inserting a tool beneath the overlying lever handle 22 on the slotted edge of the lever. This lever handle is formed by the back 18 in the present instance. On each side, near its opposite edge, the connecter 10 has a small recess 23 in which small projections or punched-out lugs or detents 24 on the lever 11 engage to frictionally retain the fastener closed.

To prevent the link 17 accidentally opening the fastener, the wall of the inner end portion of slot 19 lies flush with or outside or beyond the boundaries of cove 16 and only one wall of the slot 19, preferably that wall having the hook 20 therein, bridges or crosses slot 15 in the connecter. The hook 20 is formed by a recess in the wall of slot 19 and this recessed portion, together with the end portion of the slot that surrounds cove 16, forms a shoulder 25 that partially spans slot 15, the remainder of the slot being bridged by said recessed portion of the lever slot wall. Said shoulder 25 projects from one wall of slot 15 a distance a little less than the cross sectional dimension of the material of which link 17 is made so that the link, when pressed against the shoulder will slide off and cannot bear with any force against said shoulder. The shoulder 25, however, sufficiently closes the slot 15 to prevent the link 17 passing it and moving into the slot 15 into engagement with the recessed portion of the lever slot wall. Therefore, when the link slides off projection 25, as just mentioned, it will not enter slot 15 but will move into contact with the wall of cove 16, usually engaging said wall at a point where the cove wall merges into the wall of slot 15.

What is claimed is:

1. A tire chain fastener comprising a connecter having a link receiving slot extending inwardly from one of its edges, and a latch lever pivoted to the connecter and having a slot extending inwardly from its edge, said slot in the lever being adapted to initially engage the link and direct it into the connecter slot when the lever is turned about its pivot to close the fastener, said slots extending inwardly from the corresponding or adjacent edges of said connecter and latch with one wall of the slot in the connecter projecting beyond the corresponding wall of the slot in the latch whereby strains exerted by said end link will be imposed on the wall of the connecter and means on the latch lever for closing the entrance of the connecter slot.

2. A tire chain fastener comprising a connecter having a link receiving slot extending inwardly from one of its edges, and a latch lever pivoted on the connecter and having a slot, said slot in the lever being adapted to initially receive the free end link of a chain and direct it into the connecter slot when the lever is turned on its pivot to close the fastener, both of said slots extending inwardly from the same or corresponding edges of the connecter and latch with the lever slot and the connecter slot lying at different angles with respect to the edge of the connecter and one wall of the connecter slot protruding into the lever slot.

3. A tire chain fastener comprising a connecter having a link receiving slot extending inwardly from one of its edges, and a latch lever pivoted on the connecter, said lever being cut away adjacent the edge thereof to form a lever hook adapted to initially receive the free end link of a chain and direct it into the connecter slot when the lever is turned on its pivot to close the fastener, both of said slots extending inwardly from the same or corresponding edges of the connecter and latch lever, the wall of the cut away portion of the lever being offset longitudinally with respect to the connecter slot, whereby the lever will close the entrance of the connecter slot and one wall of the connecter slot protruding into the lever slot.

4. A tire chain fastener comprising a connecter, a latch lever, and a pivotal connection between said members adjacent one edge of the latter, there being a link receiving slot in both the connecter and lever extending inwardly from the same or corresponding edges of said members, the slot in the lever being adapted to initially receive the free end link of a chain and direct it into the connecter slot when the lever is turned on its pivot to close the fastener and one wall of the connecter slot protruding into the lever slot.

5. A tire chain fastener comprising a connecter, a latch lever, and a pivotal connection between said members adjacent one edge of the latter, there being a link receiving slot in both the connecter and lever extending inwardly from the same or corresponding edges of said members, the slot in the lever being adapted to initially receive the free end link of a chain and direct it into the connecter slot when the lever is turned on its pivot to close the fastener, said slots being offset with respect to each other at the entrances whereby the connecter slot will be closed by the lever when the latter is turned to closed position, and one wall of the connecter slot at its inner end will protrude beyond the wall of the lever slot and a lateral projection on the slotted edge of the lever for limiting the closing movement of said lever.

6. A tire chain fastener comprising a connecter having a link receiving slot extending inwardly from one of its edges to a link receiving cove, and a latch lever pivoted on the connecter and having a slot therein, both of said slots extending inwardly from the same or adjacent edges of the connecter and latch lever, said slot in the lever being adapted to initially receive the free end link of a chain and direct it into the connecter slot and cove when the lever is turned on its pivot to close the fastener, the walls of the lever slot being located outside or beyond the boundaries of said cove when the fastener is closed.

7. A tire chain fastener comprising a connecter having a link receiving slot extending in from one of its edges to a link receiving cove, and a latch lever pivoted on the connecter and having a slot therein, both of said slots extending inwardly from the same or adjacent edges of the connecter and lever, said lever slot being adapted to initially receive the free end link of a chain and direct it into the connecter slot and cove when the lever is turned on its pivot to closed position, the entrance portions of said slots being offset with respect to each other and only one of the lever slot walls bridging the connecter slot, that portion of the lever slot wall extending across the connecter slot being recessed to form a shoulder adapted to extend across the connecter slot a distance less than the cross sectional dimension of the link material but restricting said slot adjacent the cove to a width less than the cross sectional dimension of the link material, and said shoulder being located between the link receiving cove and the recessed portion of the lever slot whereby the link when in the cove cannot engage the walls of the lever slot to open the fastener.

FRANK G. GISE.